United States Patent [19]
Black et al.

[11] Patent Number: 4,725,284
[45] Date of Patent: Feb. 16, 1988

[54] THERMAL TRANSFER PRINTING WITH Z-ALKYL-PHENOXY ANTHRAQUINONE DYE MIXTURE

[75] Inventors: William Black, Sale; Roy Bradbury, Widnes; Peter Gregory, Bolton; Roy Porter, Oldham; Geoffrey R. Rothwell, Lancashire, all of England

[73] Assignee: Imperial Chemical Industries PLC, London, England

[21] Appl. No.: 886,644

[22] Filed: Jul. 18, 1986

[30] Foreign Application Priority Data

Jul. 23, 1985 [GB] United Kingdom ............... 8518571
Apr. 15, 1986 [GB] United Kingdom ............... 8609179

[51] Int. Cl.$^4$ .................................... B41M 5/26
[52] U.S. Cl. ................................ 8/471; 8/643; 8/678; 8/922; 8/928; 428/195; 428/913; 503/227
[58] Field of Search ............ 8/471, 678, 471, 678, 8/643

[56] References Cited

U.S. PATENT DOCUMENTS

| | | | |
|---|---|---|---|
| 3,174,983 | 3/1965 | Ramanathan | 8/678 |
| 3,226,177 | 12/1965 | Hosoda et al. | 8/678 |
| 3,627,792 | 12/1971 | Eltonhead | 260/373 |
| 3,980,678 | 9/1976 | Yamada et al. | 8/678 |
| 4,385,900 | 5/1983 | Mockli | 8/471 |
| 4,547,392 | 10/1985 | Majima et al. | 427/40 |
| 4,555,427 | 11/1985 | Kawasaki et al. | 8/470 |

FOREIGN PATENT DOCUMENTS 0111004 6/1984 European Pat. Off. .
0133012 7/1984 European Pat. Off. .

*Primary Examiner*—A. Lionel Clingman
*Attorney, Agent, or Firm*—Cushman, Darby & Cushman

[57] ABSTRACT

The invention relates to:
(A) A thermal transfer printing sheet comprising a substrate having a coating comprising either,
(i) a dye of the formula:

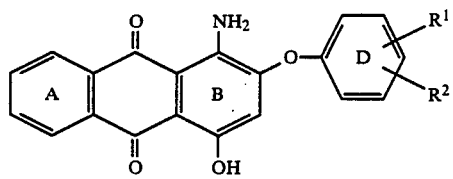

wherein
$R^1$ is $C_{5-12}$-alkyl;
$R^2$ is H or $C_{1-12}$-alkyl; and Rings A & B are optionally substituted in the free positions by non-ionic groups; or
(ii) a mixture of at least two dyes of the formula:

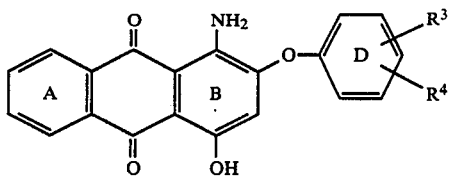

wherein
$R^3$ is H or $C_{1-12}$-alkyl;
$R^4$ is H or $C_{1-4}$-alkyl; and Rings A & B are optionally substituted in the free positions by non-ionic groups;
provided that in at least one component $R^3$ is $C_{5-12}$-alkyl and in at least one other component $R^3$ is H or $C_{1-4}$-alkyl;
(B) A thermal transfer printing process using the transfer sheets; and
(C) The mixture of dyes defined in (A)(ii).

7 Claims, No Drawings

THERMAL TRANSFER PRINTING WITH 2-ALKYL-PHENOXY ANTHRAQUINONE DYE MIXTURE

This specification describes an invention relating to thermal transfer printing (TTP), especially to a TTP sheet carrying a dye or dye mixture, to the dye mixture and to novel dye.

In thermal transfer printing a heat-transferable dye is applied to a sheet-like substrate in the form of an ink, usually containing a polymeric or resinous binder to bind the dye to the substrate, to form a transfer sheet. This is then placed in contact with the material to be printed, the receiver sheet, and selectively heated in accordance with a pattern information signal whereby dye from the selectively heated regions of the transfer sheet is transferred to the receiver sheet and forms a pattern thereon in accordance with the pattern of heat applied to the transfer sheet.

Important criteria in the selection of a dye for TTP are its thermal properties, brightness of shade, fastness properties, such as light fastness, and facility for application to the substrate in the preparation of the transfer sheet. For suitable performance the dye should transfer evenly, in proportion to the heat applied to the TTP sheet so that the depth of shade on the receiver sheet is proportional to the heat applied and a true grey scale of coloration can be achieved on the receiver sheet. Brightness of shade is important in order to achieve as wide a range of shades with the three primary dye shades of yellow, magenta and cyan. For this reason anthraquinone dyes are preferred candidates for use in TTP processes. As the dye must be sufficiently mobile to migrate from the transfer sheet to the receiver sheet at the temperatures employed, from 200°–400° C., it is generally free from ionic and water-solubilising groups, and is thus not readily soluble in aqueous or water-miscible media, such as water and alkanols. Many suitable dyes are also not readily soluble in the hydrocarbon solvents which are commonly used in, and thus acceptable to, the printing industry. Although the dye can be applied as a dispersion in a suitable solvent, it has been found that brighter, glossier and smoother final prints can be achieved on the receiver sheet if the dye is applied to the substrate from a solution. In order to achieve the potential for a deep shade on the receiver sheet it is desirable that the dye should be readily soluble in the ink medium, particularly if it has a relatively low extinction coefficient, as is the case with anthraquinone dyes. It is also important that a dye which has been applied to a transfer sheet from a solution should be resistant to crystallisation so that it remains as an amorphous layer on the transfer sheet for a considerable time.

According to a first aspect of the present invention there is provided a thermal transfer printing sheet comprising a substrate having a coating comprising a dye of the formula:

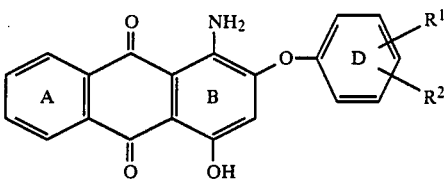

wherein
$R^1$ is $C_{5-12}$-alkyl;
$R^2$ is H or $C_{1-12}$-alkyl; and
Rings A and B are optionally substituted in the free positions by non-ionic groups.

In the dye of Formula I it is preferred that $R^2$ is H or $C_{1-4}$-alkyl and that $R^1$ is in the para position with respect to the link between rings B and D. It is preferred that $R^1$ is $C_{6-10}$-alkyl and, more especially, $C_8$-alkyl. It is further preferred that $R^1$ is branched, and more preferably highly branched, alkyl, e.g. containing from two to five $C_{1-2}$-side chains. Examples of branched alkyl groups are 1-butylhexyl, 1-propylheptyl, 1-butylheptyl, 1-pentylheptyl and 1-propylnonyl and, more especially, 1,1,3,3-tetramethylbutyl, 1,1,2,2-tetramethylpropyl, 1,1,3-trimethylbutyl, 1-ethyl-1-methylpropyl, 1,1-diethylbutyl and 1-ethyl-2,4-dimethylpentyl.

In addition to suitable thermal properties and brightness of shade, the dye of Formula I has relatively high solubility in a wide range of solvents, especially those which are widely used and accepted in the printing industry; for example alkanols, such as ethanol & butanol, aromatic hydrocarbons, such as toluene, and ketones, such as MEK, MIBK and cyclohexanone. A preferred dye in accordance with Formula I, 1-amino-2-(4-[1,1,3,3-tetrarmethyl-butyl]phenoxy)-4-hydroxy-AQ (ATHAQ), has a solubility of 7% in a 1:1 w/w toluene/MEK mixture at 25° C. This facilitates the application of the dye to the substrate from a solution and thus aids in the achievement of bright, glossy prints on the receiver sheet.

It has, however, been further discovered that the depth of shade achievable with the present dye can be further enhanced by admixture with one or more dyes of a similar general formula and according to a second aspect of the present invention there is provided a thermal transfer sheet comprising a substrate having a coating comprising a mixture of two or more dyes of the formula:

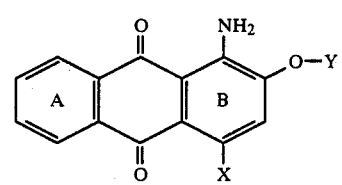

wherein
X is OH or $NH_2$
Y is is $C_{1-12}$-alkyl or a group of the formula:

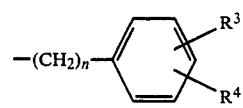

wherein $R^3$ is H or $C_{1-12}$-alkyl;
$R^4$ is H or $C_{1-4}$-alkyl;
n is 0 or 1; and
Rings A and B are optionally substituted in the free positions by non-ionic groups;
provided that at least one dye conforms to Formula I.

It is preferred that Y is a group of Formula III in which $R^3$ is para to the free valency and that in none of the component dyes are the rings A, B and D further substituted in their free positions.

Examples of the group represented by Y are methyl, ethyl, i-propyl, i-butyl, hexyl, octyl, nonyl, dodecyl, 4-methylphenyl, 4-i-propylphenyl, 4-(1,1,3,3-tetrimethylbutyl)-phenyl, 4-(1,1,2,2-tetramethylpropyl)-phenyl, 4-(1,1,3-trimethylbutyl)phenyl, 4-(1-ethyl-1-methylpropyl)-phenyl, 4-(1,1-diethylbutyl)phenyl, 4-(1-ethyl-2,4-dimethylpentyl)-phenyl, 4-(1-butylhexyl)phenyl, 4-(1-propylheptyl)-phenyl, 4-(1-butylheptyl)phenyl, 4-(1-pentylheptyl)-phenyl and 4-(1-propylnonyl)-phenyl.

Examples of dyes conforming to Formula I and Formula II are 1-amino-4-hydroxy-2-(4-[1,1,3,3-tetramethyl-n-butyl]phenoxy)-AQ, 1-amino-4-hydroxy-2-(4-[1,1-dimethyl-n-butyl]phenoxy-AQ and 1-amino-4-hydroxy-2-(4-n-nonylphenoxy)-AQ.

Examples of other dyes conforming to Formula II are 1-amino-4-hydroxy-2-(4-methylphenoxy)-AQ, 1-amino-4-hydroxy-2-(4-t-butylphenoxy)-AQ, 1-amino-4-hydroxy-2-(4-i-propylphenoxy)-AQ, 1-amino-4-hydroxy-2-n-docecyloxy-AQ, 1-amino-4-hydroxy-2-n-heptyloxy-AQ, 1-amino-4-hydroxy-2-(2-ethylhexyloxy)-AQ, 1-amino-4-hydroxy-2-benzyloxy-AQ and 1-amino-4-hydroxy-2-(1,1,3,3-tetramethyl-n-butyloxy)-AQ.

In a preferred thermal transfer printing sheet acccording to the second aspect of the present invention, the mixture of dyes comprises at least two dyes of the formula:

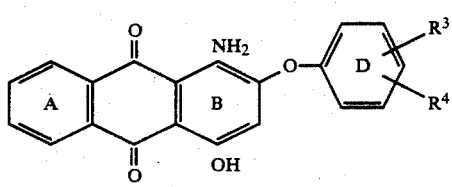

IV wherein
$R^3$ is H or $C_{1-12}$-alkyl;
$R^4$ is H or $C_{1-4}$-alkyl; and
Rings A and B are optionally substituted in the free positions by non-ionic groups;
provided that in at least one dye $R^3$ is $C_{5-12}$-alkyl and in at least one other dye $R^3$ is H or $C_{1-4}$-alkyl.

In both dyes of Formula IV it is preferred in that $R^3$ is in the para position with respect to the link between Ring B and Ring D and that Rings A, B and D are not further substituted in the free positions.

In a first preferred dye of the mixture, $R^3$ is in the para position and is H or $C_{1-4}$-alkyl, especially H or methyl, $R^4$ is H and the compound is otherwise unsubstituted. An especially suitable first dye is 1-amino-4-hydroxy-2-phenoxy-AQ (CI Disperse Red 60). Examples of other first dyes are 1-amino-4-hydroxy-2-(4-methylphenoxy)-AQ, 1-amino-4-hydroxy-2-(4-t-butylphenoxy)-AQ and 1-amino-4-hydroxy-2-(4-i-propylphenoxy)-AQ.

In a second preferred dye of the mixture $R^3$ is in the para position and is $C_{6-10}$-alkyl, more preferably $C_8$-alkyl, and is branched alkyl, more preferably multiply-branched alkyl. An especially suitable second component dye is ATHAQ. Examples of other second components are 1-amino-4-hydroxy-2-(4-[1,1-dimethylbutyl]-phenoxy)-AQ and 1-amino-4-hydroxy-2-(4-n-nonylphenoxy)-AQ.

The mixtures of dyes of Formulae II and IV as hereinbefore defined are novel and form a further feature of the present invention. In these mixtures it is preferred that the dye of Formula I, i.e. in which $R^3$ is $C_{5-12}$-alkyl comprises from from 1% to 50%, more preferably 5% to 30%, of the mixture and, where there are only two components, that the ratio of the dye of Formula I to the other dye is from 1:20 to 1:2.

Especially preferred mixtures of this aspect of the invention are a two component mixture of ATHAQ and Disperse Red 60 in a ratio from 1:20 to 1:5 and a three component mixture of ATHAQ, Disperse Red 60 and 1,4-diamino-2-phenoxy-AQ, especially in the ratio 1:5:5.

A mixture of dyes of Formula IV has particularly good thermal properties giving rise to stable inks, transfer sheets resistant to crystallisation and even prints on the receiver sheet whose depth of shade is accurately proportional to the quantity of applied heat so that a true grey scale of coloration can be attained.

The present mixtures also have strong coloristic properties and good solubility in a wide range of solvents, especially those solvents which are widely used and accepted in the printing industry, such as alkanols, e.g. ethanol and butanol, aromatic hydrocarbons, such as toluene and ketones such as MEK, MIBK and cyclohexanone.

The combination of strong coloristic properties, stability to crystallisation and good solubility in the preferred solvents allows the achievement of deeper and more even shades than is possible by using dyes from either of the two groups alone.

The substrate may be any convenient sheet material capable of withstanding the temperatures involved in TTP, up to 400° C. over a period of up to 20 milliseconds (msec) yet thin enough to transmit heat applied on one side through to the dye on the other side to effect transfer to a receiver sheet within such short periods, typically from 1–10 msec. Examples of suitable materials are paper, especially high quality papar of even thickness, such as capacitor paper, polyester, polacrylate, polyamide, cellulosic and polyalkylene films, metallised forms thereof, including co-polymer and laminated films. An especially preferred substrate comprises a laminate of a polyester layer sandwiched between two heat resistant layers, such as UV-cured acrylic resin. The acrylic resin serves to protect the polyester from the heat source during printing and to inhibit diffusion of dye into the transfer sheet. The thickness of the substrate may vary within wide limits depending upon its thermal characteristics but is preferably less that 50 µm and more preferably below 10 µm.

The coating preferably comprises a binder and one or more dyes of Formula I or a mixture of dyes of Formula II or Formula IV. The ratio of binder to dye is preferably at least 1:1 and more preferably from 1.5:1 to 4:1 in order to provide good adhesion between the dye and the substrate and inhibit migration of the dye during storage.

The binder may be any resinous or polymeric material suitable for binding the dye to the substrate which has acceptable solubility in the ink medium, i.e. the medium in which the dye and binder are applied to the transfer sheet. Examples of binders include cellulose derivatives, such as ethylhydroxyethylcellulose (EHEC), hydroxypropylcellulose (HPC), ethylcellulose, methylcellulose, cellulose acetate and cellulose acetate butyrate; carbohydrate derivatives, such as starch; alginic acid derivatives; alkyd resins; vinyl resins and derivatives, such as polyvinyl alcohol, polyvinyl acetate, polyvinyl butyral and polyvinyl pyrrolidone; polymers and co-polymers derived from acrylates and acrylate derivatives, such as polyacrylic acid, polymethyl methacrylate and styrene-acrylate copolymers, polyester resins, polyamide resins, such as melamines; polurea and polyurethane resins; organosilicons, such as polysiloxanes, epoxy resins and natural resins, such as gum tragacanth and gum arabic.

It is however preferred to use a binder which is soluble in one of the above-mentioned commercially acceptable organic solvents. Preferred binders of this type are EHEC, particularly low and extra low viscosity grades, and ethyl cellulose.

The coating may also contain other additives, such as curing agents, preservatives, etc., these and other ingredients being described more fully in EP No. 133011A, EP No. 133012A and EP No. 111004A.

According to a further feature of the present invention there is provided a transfer printing process which comprises contacting a transfer sheet coated with a dye of Formula I or with a mixture of dyes according to Formula II or Formula IV with a receiver sheet, so that the dye is in contact with the receiver sheet and selectively heating areas of the transfer sheet whereby dye in the heated areas of the transfer sheet may be selectively transferred to the receiver sheet.

The receiver sheet is conveniently a white polyester base, suitable for photographic film, preferably having a superficial coating of a co-polyester into which the dye or dye mixture readily diffuses to promote transfer of dye from the transfer to the receiver sheet.

A receiver sheet printed with a of Formula I or with a mixture of dyes according to Formula II or Formula IV forms a further feature of the present invention.

The invention is further illustrated by the following examples in which all parts and percentages are by weight unless otherwise indicated.

Ink 1

A solution of 7 g of ATHAQ in a mixture of 16 g of toluene and 17 g of MEK was prepared and after stirring for 5 minutes, 30 g of a 10% solution of EHEC in toluene and 30 g of a 10% solution of EHEC in MEK were added. The ink was then stirred with gentle heat to ensure complete solution.

Ink 2

A mixture of 4 g of CI Disperse Red 60 and 1 g of ATHAQ was dissolved in a mixture of 10.4 g of toluene and 34.6 g of cyclohexanone. The solution was stirred for 5 minutes and 50 g of a 20% solution of EHEC in MEK was added. The ink was then stirred for 30 minutes with gentle heat to ensude complete solution.

Ink 3

A solution of 3 g of CI Disperse Red 60 in a mixture of 30 g of MEK and 37 g of cyclohexanone was prepared and after stirring for 5 minutes, 30 g of a solution of EHEC (extra low viscosity type) in MEK was added. The ink was stirred for a further 30 minutes with gentle heat to ensure complete solution.

Ink 4 to Ink 9

A further six inks were prepared by dissolving 0.5 g of the dye or mixture of dyes of Formula II, indicated in Table 1, and 1 g of EHEC (extra low viscosity grade) in 18.5 g of a 2:1:1 solvent mixture of cyclohexanone, toluene and MEK. In each case the dye was added to the solvent mixture and stirred for 5 minutes, followed by the EHEC and a further period of 30 minutes stirring with gentle heat (to about 40° C.) to ensure complete solution.

TABLE 1

| Ink | Ratio of Dyes | Dye of Formula II | |
|---|---|---|---|
| | | X | Y |
| 4 | 1 | OH | 4-(1,1,3,3-tetra-methyl-n-butyl)phenyl |
| | 4 | OH | methyl |
| 5 | 1 | OH | 4-(1,1,3,3-tetra-methyl-n-butyl)phenyl |
| | 4 | $NH_2$ | methyl |
| 6 | 1 | OH | 4-(1,1,3,3-tetra-methyl-n-butyl)phenyl |
| | 4 | OH | n-dodecyl |
| 7 | 1 | OH | 4-(1,1,3,3-tetra-methyl-n-butyl)phenyl |
| | 4 | $NH_2$ | phenyl |
| 8 | 1 | OH | 4-(1,1-dimethyl-n-butyl)phenyl |
| | 4 | OH | phenyl |
| 9 | | OH | phenyl (Disperse Red 60 - control) |

Ink 10 and Ink 11

Two inks were prepared by dissolving a sample of each of the following dyes (both of Formula I) in chloroform to make a solution containing 0.45% of dye followed by sufficient EHEC to give a binder level of 0.9% (dye:binder 1:2).

| 10 | $R^1$ is 4-(1,1,3,3-tetramethyl-n-butyl-); | $R^2$ is 2-methyl |
|---|---|---|
| 11 | $R^1$ is 4-(1,1-dimethyl-n-butyl); | $R^2$ is hydrogen. |

EXAMPLE 1

A transfer sheet was prepared by applying Ink 1 to a sheet of 6 micron thick polyethylene terephthalate using a wire-wound metal Mayr-bar to produce a 2 micron layer of ink on the surface of the sheet. The ink was dried with hot air. The sheet is hereinafter referred to as TS 1.

EXAMPLE 2

A transfer Sheet was prepared in the same manner as Example 1 using Ink 2 in place of Ink 1. The sheet is hereinafter referred to as TS 2.

EXAMPLES 3 to 9

Seven transfer sheets were prepared in the same manner as Example 1 using Inks 4 to 8, 10 and 11, respectively, in place of Ink 1. The transfer sheets are hereinafter referred to as TS 4 to TS 8, TS 10 and TS 11 respectively.

COMPARATIVE EXAMPLES 1 and 2

Two transfer sheets were prepared in the same manner as Example 1 using Ink 3 and Ink 9 respectively in place of Ink 1. These transfer sheets are hereinafter referred to as TS 3 and TS 9 respectively.

EXAMPLE 10

A sample of TS 1 was sandwiched with a receiver sheet, comprising a composite structure based on a white polyester base having a copolyester receptor surface with the receptor surface of the latter in contact with the printed surface of the former. The sandwich was placed on the drum of a transfer printing machine and passed over a matrix of closely-spaced pixels which were selectively heated in accordance with a pattern information signal to a temperature of >300° C. for a period of 2 to 10 msec, whereby the dye at the position on the transfer sheet in contact with a pixel while it is hot is is transferred from the transfer sheet to the receiver sheet. After passage over the array of pixels the transfer sheet was separated from the receiver sheet. The printed receiver sheet is hereinafter referred to as RS 1.

EXAMPLES 11 to 17

The procedure of Example 10 was repeated using each of transfer sheets TS 2, TS 4 to 8, TS 10 and TS 11 in place of TS 1 and the printed receiver sheets are hereinafter referred to as RS 2, RS 4 to 8, RS 10 and RS 11 respectively.

COMPARATIVE EXAMPLES 3 and 4

The procedure of Example 10 was repeated using TS 3 and TS9 in place of TS 1, respectively, and the printed receiver sheets are hereinafter referred to as RS 3 and RS9, respectively.

Assessment of Inks, Transfer and Receiver Sheets

The stability of the inks and the quality of the print on the transfer sheet was assessed by visual inspection and the quality of the printed impression on the receiver sheet was assessed in respect of reflection density of colour by means of a densitometer (Sakura Digital densitometer). The results of the assessments are set out in Table 2.

TABLE 2

| Ink | TS | RS | Stability of Ink | Presence of Crystals on TS | Colour Density of RS |
|---|---|---|---|---|---|
| 1 | 1 | 1 | good | none | 1.32 |
| 2 | 2 | 2 | good | none | 1.51 |
| 3 | 3 | 3 | poor | yes | 1.60 |
| 4 | 4 | 4 | good | none | 0.95 |
| 5 | 5 | 5 | good | none | 0.83 |
| 6 | 6 | 6 | good | none | 0.81 |
| 7 | 7 | 7 | good | none | 1.20 |
| 8 | 8 | 8 | good | none | 1.14 |
| 9 | 9 | 9 | poor | some | 1.28 |
| 10 | 10 | 10 | good | none | 0.43 |
| 11 | 11 | 11 | good | none | 0.55 |

We claim:

1. A mixture of dyes comprising two dyes of the formula:

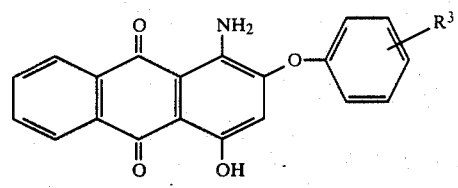

wherein in the first dye $R^3$ is branched $C_{5\text{-}12}$-alkyl and in the second dye $R^3$ is H or $C_{1\text{-}4}$-alkyl.

2. A mixture of dyes according to claim 1 wherein in the first dye $R^3$ is multiply-branched para-$C_{6\text{-}10}$-alkyl.

3. A mixture of dyes according to claim 1 wherein in the first dye $R^3$ is para-1,1,3,3-tetramethylbutyl.

4. A mixture of dyes according to claim 1 wherein in the second dye $R^3$ is H or para-methyl.

5. A mixture of the dyes 1-amino-2-(4-[1,1,3,3-tetramethylbutyl]-phenoxy)-4-hydroxy-anthraquinone and 1-amino-2-phenoxy-4-hydroxy anthraquinone.

6. A thermal transfer printing sheet comprising a substrate having a coating comprising a mixture of dyes according to any one of claims 1 to 4.

7. A thermal transfer printing process which comprises contacting a transfer sheet according to claim 6 with a receiver sheet, so that the surface of the transfer sheet carrying the dye is in contact with the receiver sheet and selectively heating areas of the opposite side of the transfer sheet at a temperature from >300° C. up to 400° C. for a period of 2 to 10 milliseconds whereby dye in the heated areas of the transfer sheet may be selectively transferred to the receiver sheet.

* * * * *